United States Patent [19]

Kutas et al.

[11] 3,862,423

[45] Jan. 21, 1975

[54] SCANNING THERMOGRAPHY

[76] Inventors: Albert F. Kutas, 18451 Durfee Cir., Villa Park, Calif. 92667; Demetro U. Tokaruk, 2219 S. Shelton, Santa Ana, Calif. 92647

[22] Filed: June 11, 1973

[21] Appl. No.: 368,992

[52] U.S. Cl. .................. 250/347, 250/334, 250/350

[51] Int. Cl. .............................................. G01t 1/00

[58] Field of Search ........... 250/353, 347, 348, 334, 250/350; 350/130

[56] References Cited

UNITED STATES PATENTS

| | | | |
|---|---|---|---|
| 2,873,381 | 2/1959 | Lauroesch | 250/347 |
| 3,261,977 | 7/1966 | Van Der Velden | 350/130 |
| 3,287,559 | 11/1966 | Barnes | 250/334 |

*Primary Examiner*—Harold A. Dixon
*Attorney, Agent, or Firm*—Gausewitz, Carr & Rothenberg

[57] ABSTRACT

A fixed housing carries an infrared energy sensor for receiving energy collected by a set of Newtonian optics. Energy is directed to the Newtonian optics by a scanning mirror mounted for continuous rotational scanning about one axis and oscillatory scanning about an orthogonal axis. The entire scanning assembly is rotatably mounted to the fixed housing for adjustably positioning the reference plane of the scan viewing axis at selected positions of adjustment about the axis of the Newtonian optics. A rectangular raster display is provided by means of a cathode ray tube beam that is intensity modulated by the sensor output. Vertical sweep of the display is synchronized to the linear portion of the oscillatory scan in both directions by means of vertical scanning position pickoff circuitry that blocks the display during non-linear motion at each end of the oscillatory scan. For making a permanent record, a C-scan display is provided by a cathode ray tube having a short persistance image screen. A camera shutter is triggered to open upon initiation of a vertical sweep and to close upon termination of the vertical sweep across this short persistance image screen. The B-scan display is used for focusing the optical system by moving the track-mounted spherical reflector of the Newtonian optics in one direction or the other so as to maximize the amplitude of the video information displayed on the B-scan.

26 Claims, 11 Drawing Figures

Patented Jan. 21, 1975

3,862,423

7 Sheets-Sheet 5

SCANNING THERMOGRAPHY

BACKGROUND OF THE INVENTION

1. Field of the Invention:

The present invention relates to methods and apparatus for collecting and processing received radiant energy and more particularly concerns radiant energy scanning for adjustably viewing a radiant energy target and providing information and displays thereof of improved quality and resolution.

2. Description of Prior Art

Radiant energy scanning systems, both active and passive, have been developed over a period of many years and in many different fields. Of relatively recent development are certain applications of radiant energy scanning systems to infrared energy. Unique applications of energy scanning of systems capable of scanning energy in the infrared wavelengths, typically in the range of 0.8 to 200 microns, have given rise to new demands and new requirements of the thermography methods and apparatus themselves. Among the many applications of infrared scanning devices are industrial thermography and medical thermography. In the field of medical thermography wavelengths of interest are in the order of .8 to 12 microns. Scanning apparatus capable of rapid and convenient access for viewing of different parts of the human body, providing instantaneous real time display, permanent records, and adaptable to quick and convenient operation and control are particularly desired.

Typical of thermographic systems previously known and presently available are the calibrated camera shown in U.S. Pat. No. 3,631,248 to Johnson, the temperature scanning apparatus of U.S. Pat. No. 3,372,230 to Wurtz and the split image scanning system shown in the U.S. patent to Kennedy, U.S. Pat. No. 3,211,046. Although these various prior art systems, among others, provide useful and to some extent, satisfactory results, they suffer from various drawbacks which, if eliminated, could greatly enhance the results achieved and extend applications of infrared scanning systems. For example, the systems shown in the Johnson and Kennedy patents, U.S. Pat. Nos. 3,631,248 and 3,211,046, are typical of many scanning systems employing three, four or six-sided scanning mirrors which inherently provide reflective surfaces of a scanning mirror that are displaced from the scanning axis. Such displacement gives rise to various types of optical errors including coma, spherical aberration, defraction limitation and other off-axis distortions.

Resolution and precision of the display in many thermographic systems is unsatisfactory for other reasons, such as nonlineareties of the scanning and less than optimum display synchronization.

Although prior systems will scan a field of view, the field of view itself cannot be readily shifted to scan different target areas or to scan a target from different observation points.

Particularly in the fields of medical and industrial thermography, it is necessary or desirable to view targets at various distances and accordingly, such applications require focusing of the energy collecting optics. For those systems employing a rectangular raster display which will provide an image that is analagous to a photographic image, it is common to focus the thermographic instrument by adjusting elements of the optical system while viewing the displayed thermographic image. The criterion employed in such focusing is the sharpness of such thermographic image. This sharpness is generally determined by the similarity, as subjectively determined by the operator of the thermographic image, to what he knows or believes a photographic image would be. That is, the focus of the thermographic instrument is varied until the thermographic image on the display is made to appear as close as possible to a photograph. It is immediately apparent that the thermal gradients of the target, (e.g. variations in thermal intensities over the surface of the target) are quite different than the intensity gradients of the reflected light of the photographic image. Hot areas and cold areas may occur without any relation to visually bright and dark areas of the target. Accordingly, when the apparatus is adjusted to provide a thermograph most like a photograph, it is not likely to be optimumly focused for the infrared wavelengths of interest.

Accordingly, it is an object of the present invention to provide radiant energy scanning and display methods and apparatus of improved resolution, convenience of handling, improved quality and which will eliminate or minimize the above-mentioned disadvantages.

SUMMARY OF THE INVENTION

In carrying out principles of the present invention in accordance with a preferred embodiment thereof, the radiant energy scanning system employs a set of fixed optics and a scanning head assembly movably mounted for adjustable rotation about the optical axis of the fixed optics. The scanning head assembly includes a reflector mounted for scanning motion about an axis coincident with the optical axis so that two mutually independent motions, a scanning motion and an adjustable motion are available about the optical axis. An additional orthogonal scanning axis is provided for use in generating a display of received radiant energy. According to another feature of the invention, a display of received energy is provided in response to each of two directions of an oscillatory scan and means are provided to limit the display to linear portions of such oscillatory scan.

An additional feature of the invention relates to electronic circuitry synchronized from the scanning motion for exposing a recording film to the face of a cathode ray tube display of received radiant energy during the occurrence of a single sweep of the display beam over an image screen of short persistance.

Still another feature of the invention resides in the focusing of the system by sweeping the viewing axis across a relatively limited strip of the target, indicating intensity of energy received by the system sensor in the course of such sweep, and varying the focal distance of the system in a sense to increase intensity of energy received.

DETAILED DESCRIPTION

Figures 1A, 6:
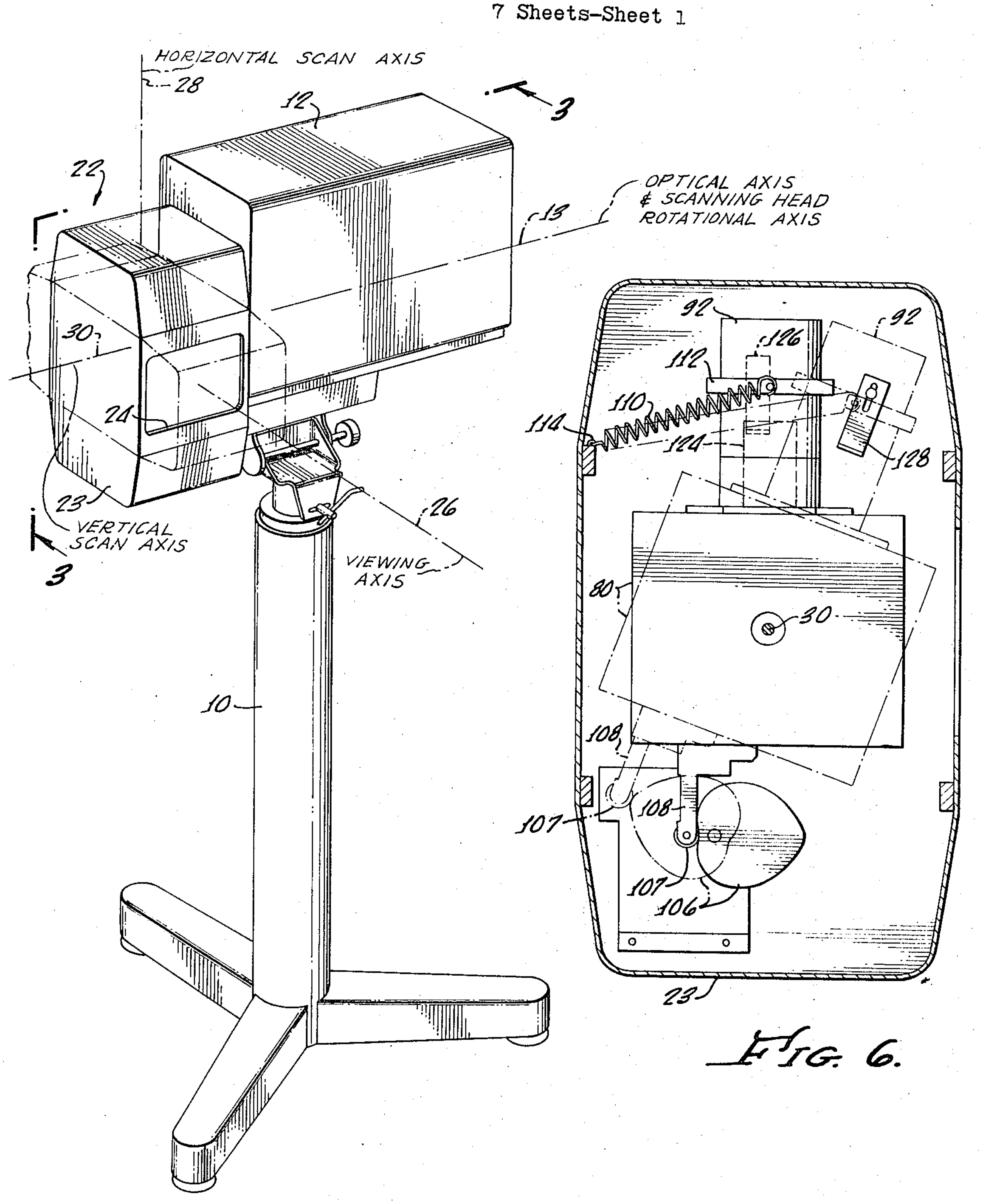
FIGS. 1*a* and 1*b* comprise a perspective view of an embodiment of the invention specifically designed for medical thermography and showing in dotted lines an adjusted position of the scanning head assembly.
FIG. 6 is a sectional view of the scanning head housing, illustrating in phantom lines the oscillation of the gimbal.
Figure 1B:
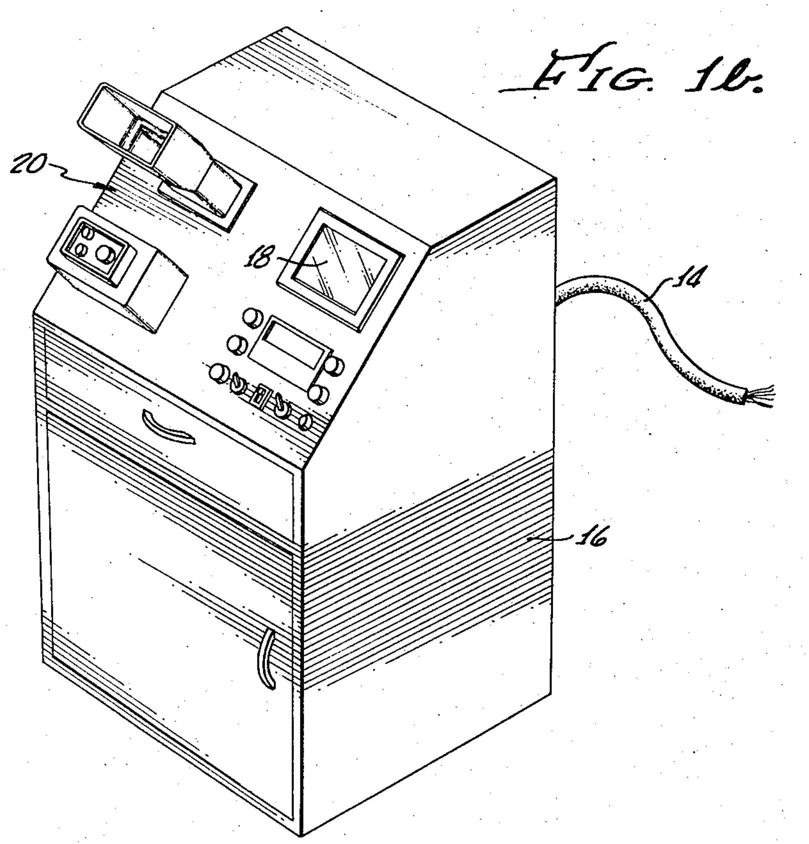

An exemplary embodiment of the present invention, designed specifically for medical thermography, is illustrated in FIGS. 1a and 1b as comprising a movable stand 10 adjustably carrying a housing 12 containing a set of fixed optics and an infrared sensor. The housing 12 is electrically connected via a cable 14 to a power supply display and electronics console 16 having a cathode ray tube display 18 for direct visual observation and a camera mount 20 adapted to receive a camera (not shown) for making permanent records of the face of a second cathode ray tube display (not shown) which is contained in the console. Additional displays, meters and indicators of the various electronic conditions and several controls are also provided in the console 16.

Journalled on the housing 12 for rotation about an optical axis 13 defined by fixed optics contained in the housing 12 is a scanning head assembly 22 having a thermal energy receiving window 24 for collecting thermal energy that is received from a field of view substantially centered about a viewing axis 26 of the scanning head assembly 22. Scanning head assembly 22 mounts a mirror (not shown in FIG. 1) that defines the viewing axis 26 and which is mounted for scanning motion about two mutually orthogonal axes 28 and 30.

In the embodiment illustrated herein, the mirror rotates continuously about axis 28 to provide horizontal scan lines wherefor this axis is called the horizontal scan axis. The mirror also oscillates back and forth about the axis 30 to provide vertical scanning, wherefor axis 30 is termed the vertical scanning axis. The terms "horizontal" and "vertical" are employed herein to define relations between the axes and scanning motions, and are not intended to define any specific orientations relative to the earth. Vertical scanning axis 30 is coincident with the optical aixs 13 of the fixed optics, which is also coincident with the axis of rotation of scanning head assembly 22 relative to the fixed housing 12. Thus, the described arrangement allows the viewing axis 26 to scan about the vertical scanning axis 30, the oscillation being a limited angular displacement above and below a reference plane defining a zero degree reference position or displacement of the viewing axis. In addition to these scanning motions, the entire scanning head assembly 22 may be adjustably rotated relative to the fixed housing 12 about the coinciding axes 13, 30 to selectively adjust the reference position of the viewing axis 26 in its vertical scan. The scanning head assembly is mounted for rotation relative to the fixed housing 12 through an angle of 270°, preferably, so that the viewing window 24 may be directed to either side, downwardly or upwardly relative to the fixed housing 12.

Suitable electronics, positioning and position detectors are provided to create in the console 16 a display in the form of a rectangular raster in the exemplary embodiment. The display raster comprises a plurality of successively vertically displaced horizontal scan lines each having a length equivalent to approximately twenty angular degrees of scanning motion about the horizontal scan axis 28. One full set of horizontal scan lines that is obtained in a single upward or a single downward sweep of the scanning mirror about the vertical scan axis 30 comprises one full frame. The arrangement is such that one full frame of horizontal scan lines is provided for each full upward and for each full downward sweep of the oscillatory vertical scan, as will be more particularly described below.

Figure 2:
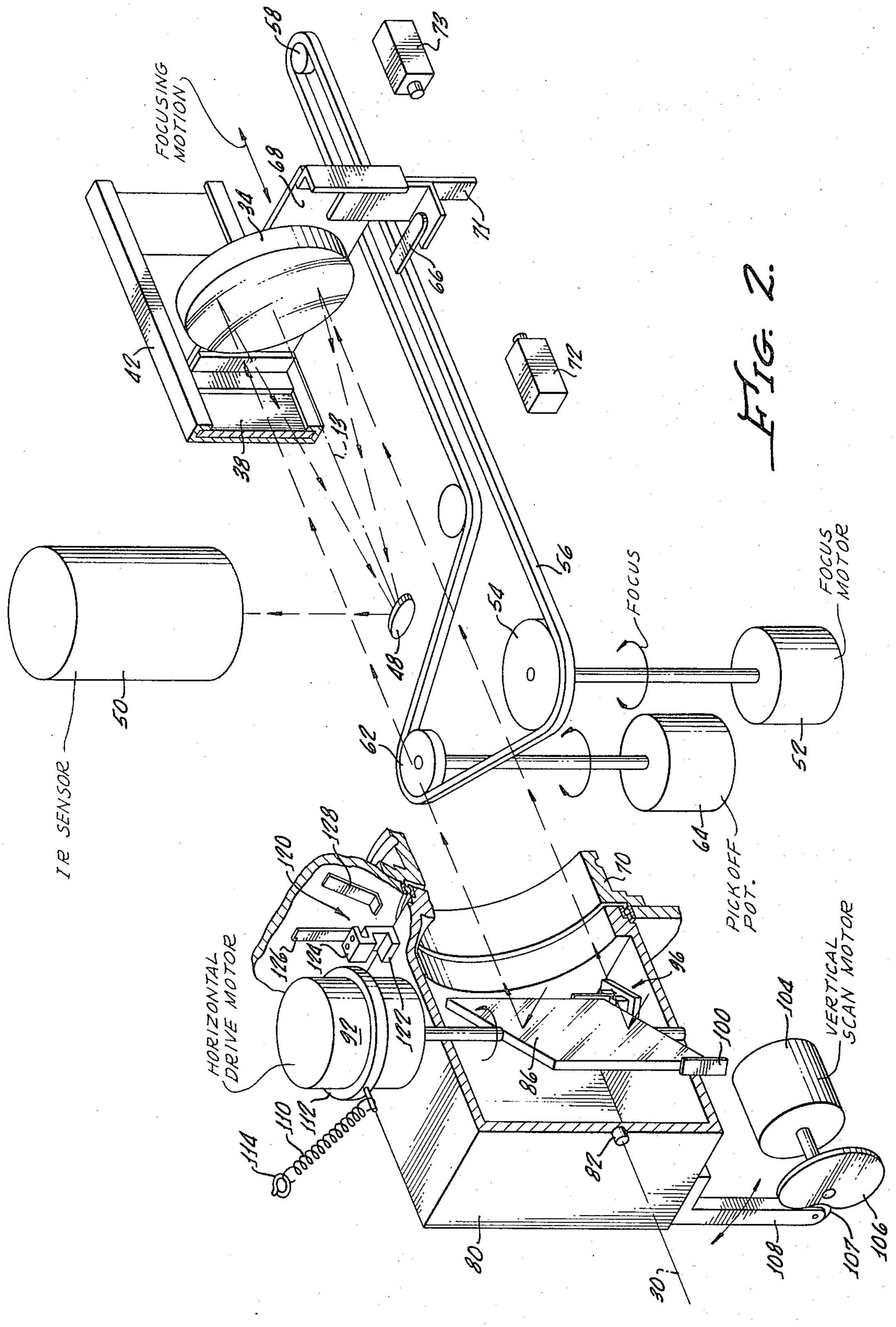
FIG. 2 is a perspective view, with parts omitted, showing in schematic form the major mechanical and optical components of the scanning and sensing equipment of the embodiment of the invention shown in FIG. 1.

Illustrated in FIG. 2 is a schematic perspective drawing of the optical and mechanical components of the fixed and scanning optics, with certain parts omitted in order to more clearly illustrate the relative positioning and functioning of the several components.

Figure 3:
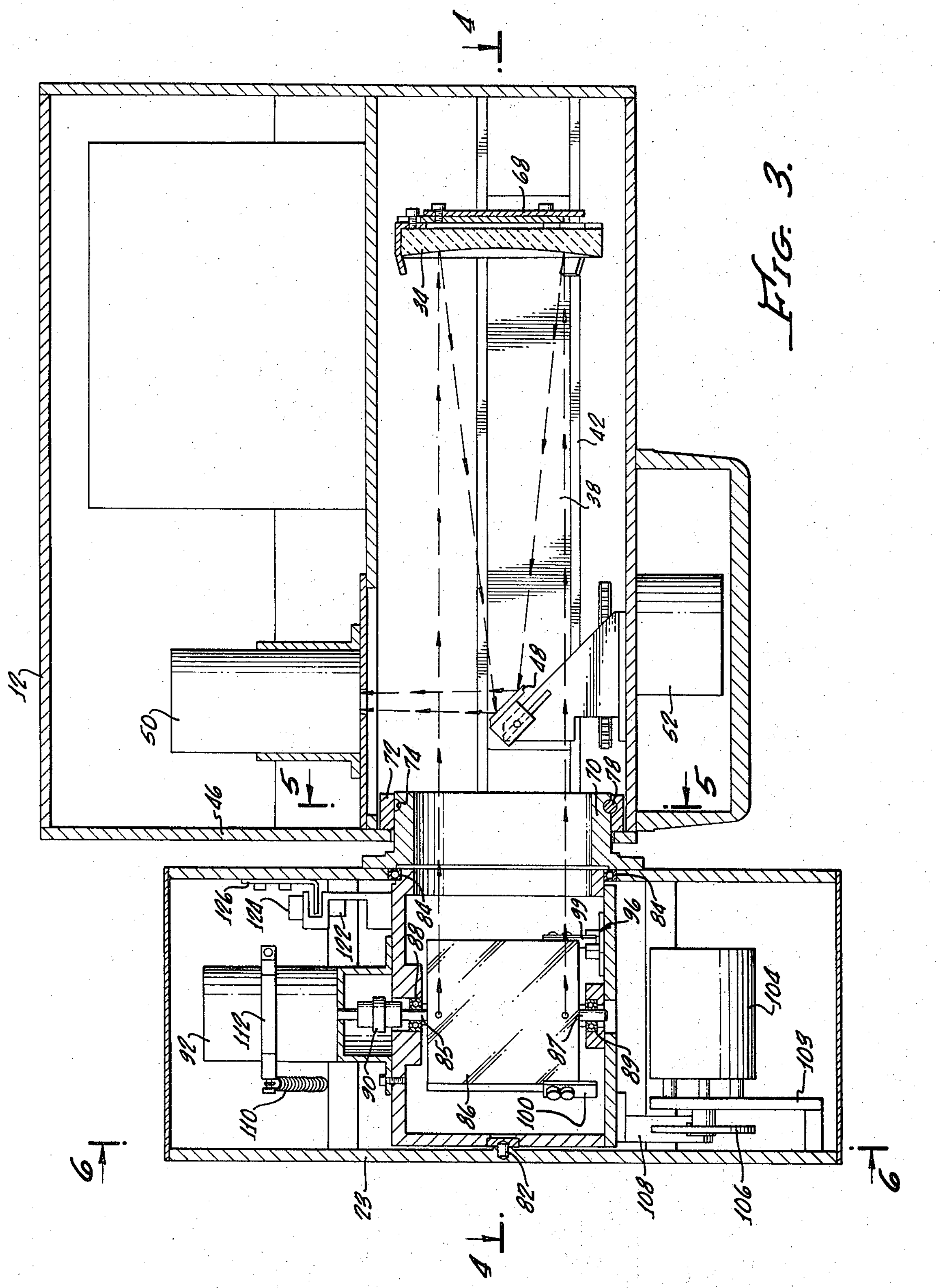
FIG. 3 is a vertical section of the fixed housing and scanning head housing of FIG. 1.
Figures 4, 5:
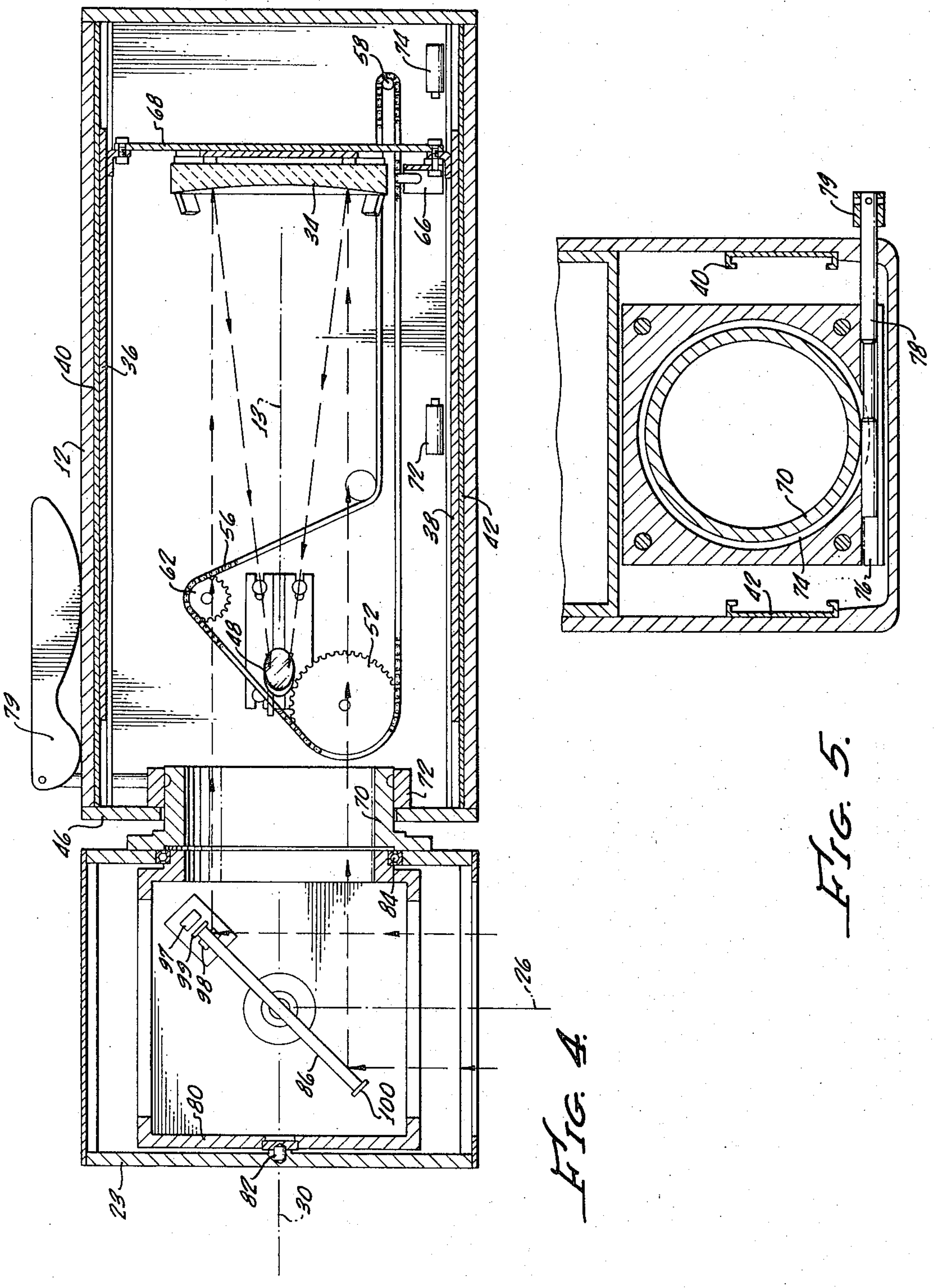
FIG. 4 is a horizontal section through the fixed housing and scanning head housing of FIG. 1.
FIG. 5 is a vertical section showing the rotatable mounting of the scanning head assembly to the fixed housing

Referring to FIGS. 2, 3 and 4, the fixed optics comprises a primary mirror 34 fixedly mounted upon a pair of moving rails 36, 38 that are slidably carried in tracks 40, 42 affixed to the housing 12. The primary mirror 34 and its slidable mounting define the optical axis 13 along which energy is received through an input port formed in the front wall 46 of the fixed housing 12. Energy reflected by the primary mirror 34 is returned to a folding mirror 48 that is fixed to the housing 12 and is then focused upon the sensor of an infrared sensor assembly 50 also carried by the fixed housing 12. It will be readily appreciated that various types of infrared sensing for thermal energy detection may be employed. Typical of those available are the detectors made of Silicon, Indium-Antimonide or mercury cadmium telluride and suitably cooled. The latter is preferred for range of 7 to 14 microns, whereas a Silicon detector is preferred for a ramge of 0.7 to 1.2 microns. Indium-Antimonide is used for the range of 1.0 to 7 microns. Detectors of this kind are particularly applicable to medical thermography since the human body has a thermal temperature of approximately 87° F., which has a peak spectral emmittence at approximately 9.5 microns.

The fixed optics is adapted to be focused by means of a remotely controllable motor 52 driving a gear 54 which is enmeshed with a chain 56 entrained about idler gears 58, 60 and about a pickoff gear 62. Pickoff gear 62 drives a position pickoff in the form of a rotatable potentiometer 64 which generates a position pickoff signal to the control panel for presentation of focal length display. If deemed necessary or desirable, the signal from pickoff 64 may be employed in a closed loop focusing circuit by comparison with a commanded primary mirror position signal to thereby generate an error signal to drive the motor 52.

Drive chain 56 has an arm 66 fixed thereto which, in turn, is rigidly attached to a cross member 68 that fixedly mounts the primary mirror 34 to the rails 36,

38. Also carried by the cross member 68 is a strike arm 70 that operates one or the other of a pair of limit switches 72, 74 mounted to the housing 12 to limit focusing travel of the primary mirror.

The scanning head assembly 22 comprises a scanning head housing 23 having an output port 25 defined by a circular hub 70 (FIGS. 3 and 4) that is fixed to housing 23 and is slidably and rotatably received within a bushing 72 that is rigidly attached to the fixed housing 12, circumscribing the input port thereof. Hub 70 is formed with an external annular groove 74 that mates with a linear groove 76 (FIG. 3) that extends through the bushing 72 to receive a locking pin 78. With the pin inserted in the mating grooves 74, 76, the scanning head assembly is locked to the fixed housing 12 against withdrawal although the assembly may be rotated about the optical axis of the fixed optics. The pin 78 may be a tapered pin which, when driven more firmly into the mating grooves 74, 76, will lock the two against relative rotation and which when partially withdrawn will allow relative rotation about the optical axis although still preventing detachment of the scanning head assembly. Preferably, the pin is of the type that includes a handle 79 that is operable to cause the pin to expand radially. In radially retracted position, the pin will prevent detachment of the scanning head assembly although permitting rotation relative to the fixed housing, whereas in radially expanded position, the pin will lock the scanning head assembly against rotation.

Journalled in scanning head housing 23 for rotation about the vertical scan axis 30 is an outer gimbal or rotatable support 80. Gimbal 80 is journalled to the housing 23 by means of a pin 82 on the outer side of the gimbal and bearings 84 on the inner side of the gimbal. Bearings 84 circumscribe the output aperture of the scanning head assembly and are positioned to cooperate with the pin 82 so as to define the vertical scan axis 30, which is coaxial with the optical axis 13.

A mirror 86 is journalled in bearings 88, 89 carried by the outer gimbal 80. Preferably, the mirror is formed of a high mass, thin, rigid sheet of metal having a pair of oppositely disposed, precisely parallel, highly polished reflective surfaces. Pivot pins 85, 87 are a press fit in the rigid integral mirror sheet and are journalled in the outer gimbal or rotatable support 80 by means of bearings 88, 89. Pin 85 is connected to a drive coupling 90 which, in turn, is connected to a horizontal scan drive motor 92 that is fixedly mounted to a motor bracket 94 carried by the outer gimbal 80. The bracket 94 provides a space between the motor and the gimbal 80 to receive the coupling 90.

This arrangement positions the mirror surfaces substantially on the axis of rotation 28 of the mirror to thereby minimize distortions mentioned above.

Affixed to the gimbal 80 is an optical pickoff 96 including a light source 97 and a photo-sensitive detector 98 spaced to receive each of a pair of horizontal scan flags 99, 100 that are fixed to oppositely disposed edges of the mirror 86 so as to successively pass between the source 97 and photo-sensitive detector 98 as the mirror is driven in its continuous horizontal scanning rotation by motor 92. Each time that the one of the flags 99, 100 passes between the pickoff elements 97, 98, the signal from the sensor 98 is interrupted to provide a position pickoff signal to electronics to be more particularly described below.

Vertical scanning of the mirror 86, which is an oscillatory angular displacement of the outer gimbal 80 (together with the rotatably mounted mirror 86) about the vertical scanning axis 30, is achieved by means of a motor 104 carried by a bracket 103 that is fixed to housing 23. The motor has a drive shaft 105 to which is fixed a driving cam 106. Motor 104 continuously drives cam 106 in a single direction of rotation to repetitively and cyclically drive the outer gimbal 80 in a clockwise direction as viewed from the left in FIG. 2, for example, by means of a cam follower 107 rotatably carried by a cam follower arm 108 that is fixed to the bottom of gimbal 80. As a radially larger portion of cam 106 comes in contact with the cam follower 107, 108, a clockwise force is exerted upon the gimbal 80 to displace this gimbal in a clockwise direction until a smaller portion of the cam contacts the follower 107 to allow a counter-clockwise restoring force to be exerted. The counter-clockwise restoring force on the gimbal 80 is provided by means of a tension spring 110 that is connected between a clamp 112 fixed to the motor 92 and a fitting 114 fixed to the scanning head assembly housing 23.

To identify a position of the outer gimbal 80 (together with the rotatably mounted mirror 86) in the course of its oscillatory vertical scan about the vertical scanning axis 30, a vertical scanning position pickoff assembly 120 (FIG. 3) is employed. Pickoff assembly 120 comprises a portion fixed to the gimbal 80 and having an optical source 122 and a photo-sensitive sensor 124 defining a slot for reception of each of a pair of vertical scan flags 126, 128 that are spaced from each other and fixed to the scanning head housing 23. The vertical scan flags 126, 128 are positioned relative to the gimbal mounted elements of pickoff 120 so as to provide first and second position signals each of which occurs at a time when the mirror is near a terminal portion of each half cycle of its vertical scan.

As described herein, the oscillatory vertical scan includes a first direction of motion which may be termed an upward sweep or counter-clockwise pivoting of the gimbal 80 as viewed from the left in FIG. 2, and a second half cycle which may be termed a downward sweep, a clockwise angular displacement of the gimbal 80 as viewed from the left in FIG. 2. The manner of use of such identification of points adjacent the terminal positions of each upward sweep and of each downward sweep will become apparent from the detailed description of the display synchronization and control to be set forth below. Briefly, this sensing allows use of both the upward sweep and downward sweep of the mirror oscillation about axis 30 and enables the electronic circuitry to provide a dwell time in and about the two terminal positions of the oscillatory scan. During this dwell time, the gimbal and mirror are decelerating, reversing direction and accelerating, wherefor their motion is nonlinear. Thus, this portion of the motion of the vertical oscillatory scan, at each end of each half cycle of the oscillation about the vertical scanning axis 30, is eliminated from the display during the dwell time that is identified by the two position pickoff signals provided by the flags 126, 128.

Figure 8:
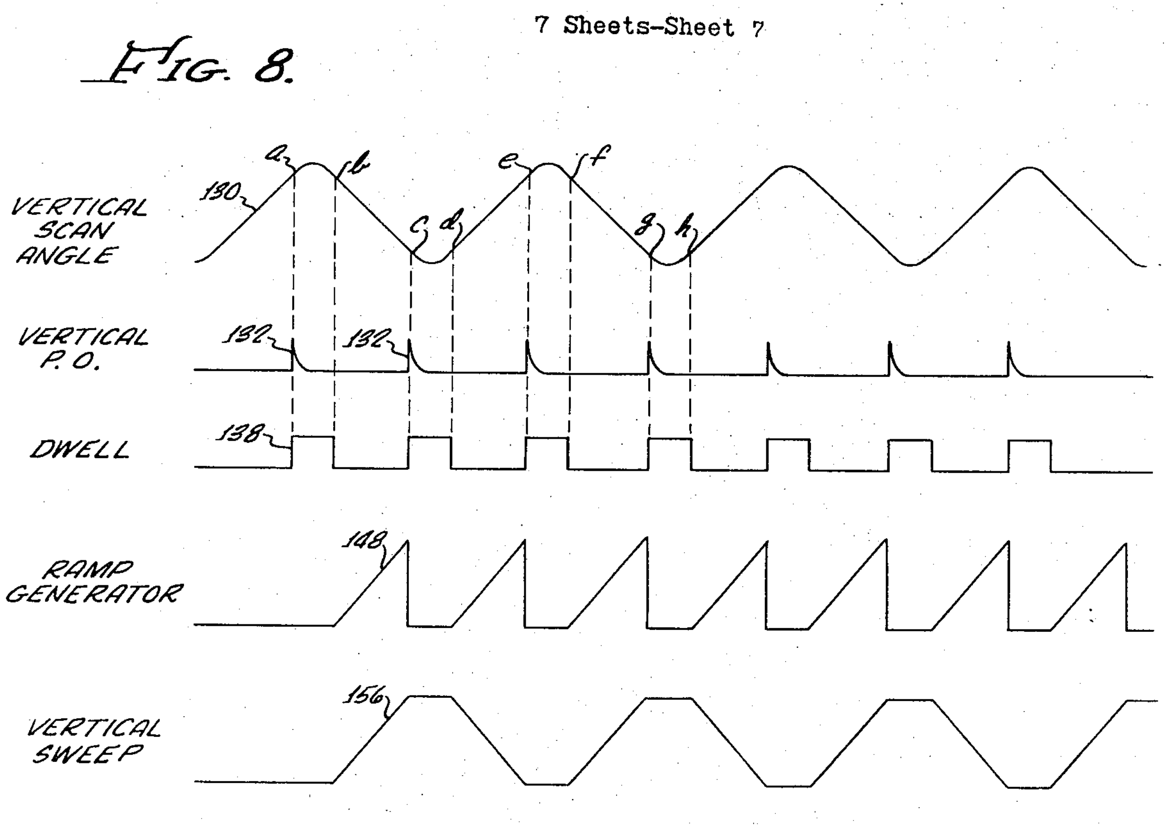
FIG. 8 is a synchrograph of wave forms illustrating synchronization of the vertical display sweep with the vertical scanning of the reflector.

The vertical oscillatory scan is illustrated in an idealized form as wave form 130 in the synchrograph of FIG. 8 wherein time is presented on the horizontal axis and angle of displacement of the mirror 86 about the vertical scan axis 30 is presented along the vertical axis.

During each direction of the vertical scan, as the mirror approaches one of its terminal positions where its direction is reversed, its motion is non-linear. These non-linear portions of the oscillatory scanning motion are indicated as occurring between points (times) *a–b*, points *c–d*, *3–f*, and *g–h*, etc., in FIG. 8. The vertical pickoff 120 has the parts thereof positioned so as to provide pickoff pulses 132 occurring at times *a*, *c*, *e*, *g*, etc., which are the times at which the scanning motion begins to decelerate. These pickoff pulses, with suitable amplification and signal shaping, (not shown) are transmitted to a dwell generator 136, FIG. 7, which generates a dwell signal or a time delay by means of delay or dwell pulses 138 of FIG. 8. Dwell generator 136 provides an output pulse on line 142, which occurs at the trailing edge of the delay pulses 138 to start the running of a vertical ramp generator 144 which begins to produce, upon an output line 146, the Y axis or vertical ramp 148. The vertical pickoff signals from pickoff 120 are also fed directly to the vertical ramp generator 144 to terminate the ramp. Thus, if ramp 148 is being generated during occurrence of a vertical pickoff signal from pickoff 120, such ramp is thereupon terminated. Accordingly, each vertical pickoff signal not only initiates a dwell time interval but also terminates a ramp that was initiated upon termination of a prior dwell time interval. the ramp 148 has a linear rising portion that coincides in time with the linear scan portions between points *b* and *c*, between points *d* and *e*, etc.

The output of vertical ramp generator 144 is fed directly to a first gate 149 and, through an inverter 150, to a second gate 152. The two gates are alternatively enabled by the high and low outputs respectively of a flip flop 154 that is toggled to change state upon occurrence of each vertical pickoff signal, all of which are fed as a toggle input to the flip flop. Accordingly, at the common output of gates 149, 150, or line 158, appears the vertical sweep signal 156 (FIG. 8) which is derived from the ramp 148, but having every other one of its slopes reversed in polarity. The vertical sweep signal 156 is fed from the common gate outputs via line 158 and through a first mode switch S1 to the Y axis or vertical deflection circuitry 161 of a first cathode ray tube 160 positioned in the console 16. Accordingly, with the switch S1 in the illustrated position, the beam of the cathode ray tube is caused to sweep along the Y axis first upwardly to an upper terminal position where it dwells for a short period and then begins to sweep downwardly to a lower terminal position where it likewise dwells for a short time, and continues to repeat these upward and downward sweeps, all spaced by the dwell periods. Obviously, other circuits may be employed for producing the described symmetrical bipolar ramp for the vertical deflection of the display.

With the illustrated arrangement, both half cycles of the vertical scanning oscillation are employed and the cathode ray tube beam is linearly deflected in accordance with the vertical oscillation of the mirror in both upward and downward sweeps.

Horizontal scanning occurs at a sweep rate synchronized with the much higher horizontal scanning velocity of the mirror about the horizontal scanning axis 28. It may be noted designed in an exemplary embodiment that has been specifically design for medical thermography, the horizontal scan rate, that is, rotation about axis 28, is at a rate of about 4,500 rpm and the vertical oscillation is at a rate sufficient to create a full cycle, that is, a complete upward and downward sweep in about 8 seconds. Employing the described two-sided mirror, the cathode ray tube beam will trace 300 sweeps during the four second duration of a single downward or of a single upward vertical sweep.

Figure 9:
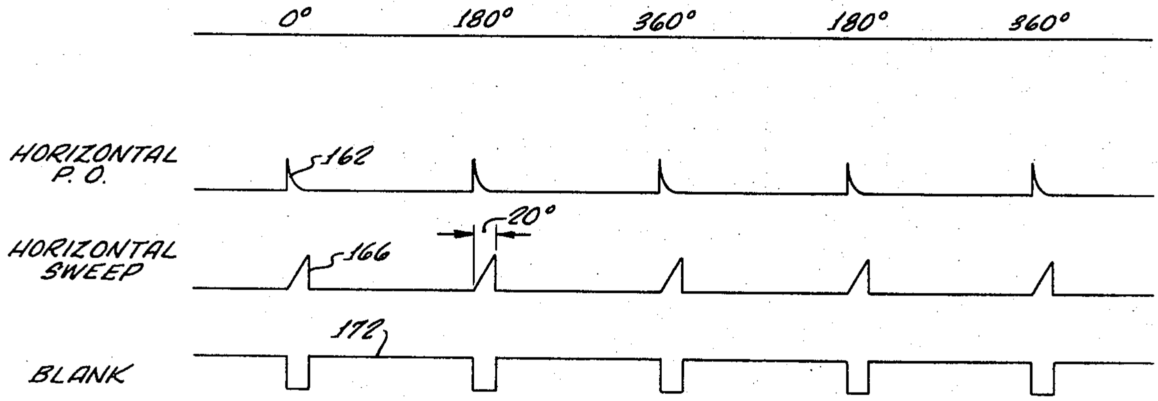
FIG. 9 is a synchrograph illustrating synchronization of the horizontal sweep with the horizontal scanning.

Signals 162 (FIG. 9) from horizontal pickoff 96 are fed to trigger a conventional horizontal sweep generator 164 that produces a horizontal sweep sawtooth 166 having a predetermined slope and duration provided by internal circuitry of the sweep generator. The horizontal sawtooth sweep signal, which appears on line 168, is fed to the X axis or horizontal deflection circuitry 169 of the cathode ray tube to provide deflection of the cathode ray tube beam across the face of the tube.

The horizontal pickoff signals are also fed to a horizontal gate generator 170 to terminate a blanking signal 172 which is initiated by feeding the horizontal sweep to the horizontal gate generator. The steep negatve going portion of the horizontal sweep sawtooth initiates the blanking signal which is then fed to the cathode ray tube blanking circuit 173. The apparatus is arranged so as to provide a field of view of 20° through both the horizontal and vertical scans. That is, for the vertical scan (oscillation about axis 30), the outer gimbal 80 together with mirror 86 rotates both 10° above and 10° below a reference plane. The reference plane may be defined as a plane containing the vertical scan axis 30 and bisecting the viewing window 24.

Horizontal scanning of the mirror, that is, the continuous rotation about the horizontal scanning axis 28, allows the viewing axis 26 to sweep across the target for a field a view of 20°. There is one such a 20° field of view or viewing period for each side of the two-sided mirror, and accordingly, a pickoff signal caused by one of flags 99, 100 occurs at a predetermined point (the beginning of a 20° viewing period, for example) of a horizontal scan by one side of the mirror across the field of view. The mirror then continues its rotation for the succeeding 160° and the flag on the other side of the mirror then breaks the optical path of the horizontal pickoff to provide a second pickoff signal (for the full 360+ of minor rotation about axis 28) at a point 180° removed from the point of occurrence of the pickoff signal caused by the flag on the other side of the mirror. The horizontal sweep generator 164 is adjusted to provide its saw-tooth signal 166 for a duration equal to the time required for 20° of rotation of the mirror about its horizontal scanning axis 28 when driven at a predetermined speed by the motor 92. Thus, there are provided two 20° horizontal scans for each full revolution of the scanning mirror and two 20° vertical scans for each full cycle (both up and down) of the mirror oscillation.

The video signal for display is obtained from the infrared sensor or detector 50 and fed through signal amplification and signal conditioning circuits (not shown), to an adjustable temperature range circuit 174. The electrical analog signal provided by the detector 50 comprises an analog signal of amplitude representing the intensity of energy received by the detector and within the range of wave lengths to which the detector is sensitive or responsive. Range circuit 174 adds or subtracts a DC signal to the analog video under control of a manually operated knob 176. Thus, if a low level of thermal radiation is being received, a DC signal may be added to the video to enhance the low-level display. On the other hand, if it is desired to display solely a limited range of the higher intensities of received radiation, a DC signal is subtracted by the circuit 174 from the video for the display presentation.

The range adjusted video from detector 50 and circuit 174 is fed via a second switch S2 to the Z axis or intensity modulation circuitry 175 of the cathode ray tube to vary the intensity of the display on the imaging screen in accordance with intensity of received energy.

Each of the sweep and video signals is fed in parallel, via lines 178, 180 and 182, to a second cathode ray tube, (not shown) which will provide a continuous rectangular raster display and thus present a two dimensional thermograph of the target within the field of view. The first cathode ray tube 160 has the intensity modulation and vertical sweep information fed thereto via the switches S1 and S2, which are ganged for operation in unison, in order to allow presentation of the information alternately in C-scan or B-scan display. In the B-scan display, the X axis sweep remains the same but no vertical or Y axis sweep is employed. Instead, Y axis deflection is provided by the video signal. Under control of a mode control switch M, switches S1 and S2 may be moved to the non-illustrated B-scan positions. In B-scan position, the switches will feed the video from detector 50 and range circuit 174 to the Y axis deflection circuit 161. In this B-scan mode, a variable level manually controllable intensity signal, generally of increased intensity, will be fed via switch S2 to the Z axis circuit 175 to provide an increased steady state Z axis level. If deemed necessary or desirable, the blanking signal 172 may be fed with suitable polarity to suppress the Y axis deflection signal during the two 160° periods of the mirror horizontal scan. During these 160° periods, the mirror viewing axis is not directed at the target. The blanking signal in B-scan mode is presented to the Y deflection circuit via the switch S1 in its B-scan position.

Figure 7:
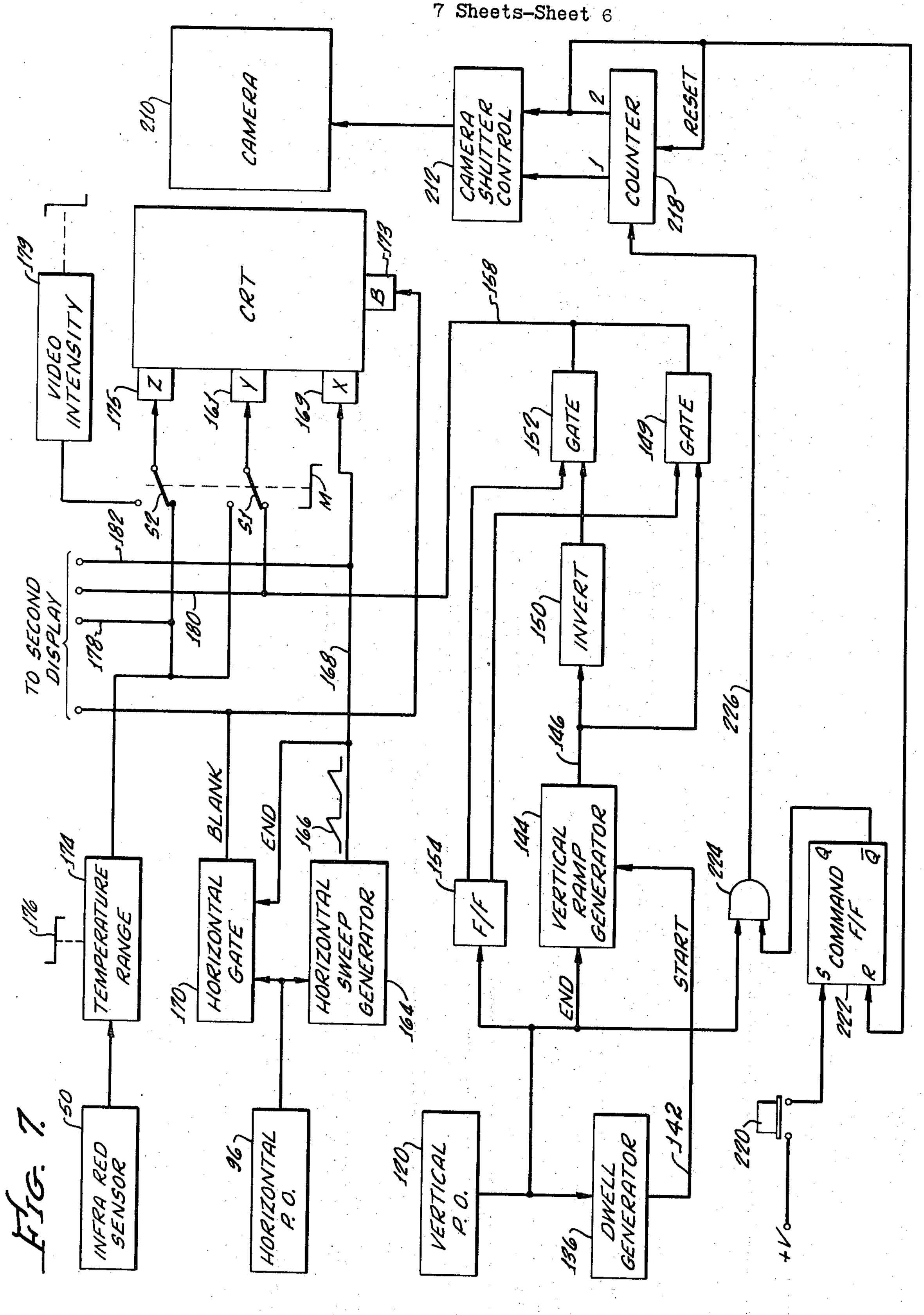
FIG. 7 is a block diagram of electronics for control of the system of FIG. 1.

For a C-scan display, switches S1 and S2 are placed in the positions illustrated in FIG. 7, wherefor the cathode ray of the display is deflected by both horizontal sweep 166 and vertical sweep 156 while being intensity modulated by the video from circuit 174.

The mode selector switch M may be used to provide the B-scan display while the vertical oscillation motor 104 is causing the vertical sweep of the mirror. Alternatively, if a single horizontal scan line is desired, the vertical sweep drive motor 104 may be stopped by a suitable manual control on the console 16.

Focusing of the optical system upon a target at a selected distance from the apparatus is achieved by a manual control on the console 16 that is connected to drive the focusing motor 52 in one direction or the other for as long as the control is operated and in the direction in which the control is operated. Pickoff 64 sends a signal to a suitable meter on the console 16 that is calibrated to provide a visual indication of the adjusted position of the primary mirror 34 in terms of focal length of the system. However, it is found that greatly improved accuracy of focusing can be obtained by operating the focusing motor in response to detected intensities of radiation received during one or repetitive horizontal scans of the viewing axis across the field of view. Preferably, for focusing, such scan is caused to traverse a relatively small angle, viewing a narrow strip of a target that has a narrow depth of field. In other words, the focusing scan initially should be directed across a line on a target, all points on the line being equidistant from the optical focus. Nevertheless, despite the fact that the target, of which a thermal image is to be provided, may depart from the ideal conditions for focusing, it is found that significantly improved focusing is in fact provided by the use of the described method, viewing the actual target of the thermography.

Figure 10:
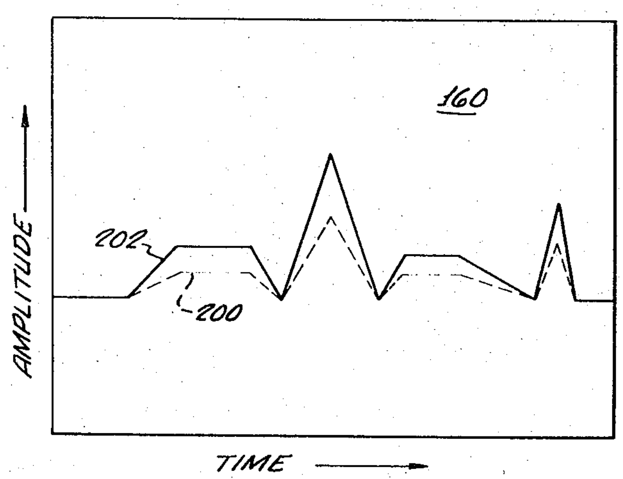
FIG. 10 illustrates B-scan wave forms appearing on the display screen during focusing.

With the display controls and the alternate C-scan and B-scan mode controls provided by the arrangement of switches S1, S2 and control M of FIG. 7, it is convenient to employ the B-scan mode of the apparatus for use in the improved focusing. This is accomplished in the following manner: With the ganged switches S1 and S2 moved to the B-scan position, and with the vertical scanning motor 104 stopped by suitable motor control on the console 16, a B-scan presentation is provided as indicated by the dotted line 200 of FIG. 10. The horizontal scan continues to repetitively sweep a narrow strip of the target during this B-scan display. If the apparatus is not properly focused upon the target, the displayed amplitudes are of relatively decreased magnitude and furthermore, the slopes of the displayed signal have a decreased rise (an increased time of rise or fall). Accordingly, the operator, while viewing the B-scan display of the imaging screen of the cathode ray tube 160, as illustrated in FIG. 10, will operate the focusing motor 52 in one direction or the other to move the primary mirror 34 in one direction or the other until a position is reached at which the amplitudes of the display 200 appear at peak or maximum values. Such maximum values are indicated by the solid line analog curve 202 of FIG. 10. When these peaks are at their maxima, the apparatus is properly focused.

The described manual operation of the focusing arrangement, in response to observed intensities of received energy occurring during repetitive scanning of a limited angle of the target, is preferred for its simplicity. Nevertheless, it will be readily appreciated that that the various peak intensities of the repetitive or single scans may be fed to a computer and suitably processed so as to provide a signal for automatic control of the focusing motor 22 so as to maximize the detected intensities and thereby provide a completely automatic focusing of the system.

For making a permanent record of the complete rectangular raster during its C-scan mode or for a record of a single B-scan line, console 16 is provided with a mounting to receive a camera 210 (FIG. 7) having a shutter control mechanism 212 operable to open and close the shutter in response to steady state signals received on lines 214, 216 provided at first and second outputs of a counter 218. Upon momentary operation of a camera command switch 220 (FIG. 7) a command flip flop 222 is set and remains in set condition until an input is received at its rest input R. The output of the flip flop is fed as a first input to an AND gate 224 which is therefore armed or enabled upon operation of the command button 220. The second input to the AND gate 224 is derived from the output of the vertical pickoff 120 and comprises the several vertical pickoff signals described above. Thus, once armed, the next vertical pickoff signal will provide an output from AND gate 224 on line 226 which is fed as a counting input to the counter 218. The counter may be a pair of flip flops connected to provide a divide by two and divide by four operation, whereby upon receipt of the first counting input on line 226, a first stage or first flip flop of the counter provides a steady output on line 214. Upon occurrence of the very next signal from the vertical pickoff 120 AND gate 224 provides a second counting input to the counter, on line 226, and a steady state input is provided on line 216.

A signal on line 214 will cause the camera shutter to open, in which condition it remains until a succeeding signal occurs on line 216, in response to which the camera shutter will close. The signal on line 216 is also fed back to reset the counter to zero and, further, to reset command flip flop 222 so that the apparatus is once again in position to respond to a momentary depression of command button 220 and a pair of succeeding vertical pickoff signals. Accordingly, with the illustrated arrangement operated with the cathode ray tube 160 in the C-scan mode, in which the cathode ray tube beam traces a plurality of horizontal scans, each successively displaced vertically from the preceeding scan, the camera shutter is opened in response to a first one of a pair of successive vertical pickoff signals and will remain open until occurrence of the next succeeding vertical pickoff signal, whereupon the camera shutter is closed. It will be observed that the camera may record either a single upward sweep of the cathode ray tube display or a single downward sweep of the cathode ray tube display. The photographically recorded image is provided with optimum clarity because the screen of the cathode ray tube 160 employs a phosphor having a relatively short persistance. Thus, each horizontal sweep of the beam, even though it is provided with increased intensity via the video intensity circuit 179 in B-scan mode, has disappeared when the succeeding horizontal sweep is initiated. It may be noted that the screen of the second cathode ray tube that is operated by signals on lines 178, 180 and 182 has a more common relatively long persistance screen so each complete half cycle of 4 seconds and 300 horizontal lines will be displayed and remain displayed for a suitable period of time (such as 3 to 4 seconds) due to the phosphor persistance.

If deemed necessary or desirable, video of both C-scan and B-scan displays may be blanked during the dwell time represented by signals 138, 140 of FIG. 8 for example.

Although the described embodiment of the invention is specifically designed for scanning at infrared wavelengths, it will be readily appreciated that the principles of the invention, and substantially all of the structure are directly applicable to scanning at other wavelengths and in other frequency ranges.

There have been described methods and apparatus for scanning of radiant energy in arrangements particularly adapted for scanning thermography wherein a scanning head assembly is adjustably positioned about the input axis of a set of fixed optics including a detector and wherein one of the scanning axes is coincident with the input optical axis. An improved mirror construction has been described wherein a thin, rigid, high-mass two-sided mirror is mounted with both reflective surfaces substantially on a scanning axis. Synchronization of vertical deflection of a display with vertical scanning oscillation of the mirror provides improved quality and linearity of display. A permanent record is readily made by a unique synchronization of a camera with a short persistence C-scan display and focusing of the thermal energy receiving system is enhanced by use of intensities of energy received during a series of repetitive scans of a target.

The foregoing detailed description is to be clearly understood as given by way of illustration and example only, the spirit and scope of this invention being limited solely by the appended claims.

We claim:

1. Radiant energy scanning apparatus comprising
a fixed housing including
an input port for receiving radiant energy incoming along an energy receiving axis,
a sensor for providing an output signal indicative of received radiant energy, and
means for collecting energy received at said input port and focusing such energy upon said sensor,
a scanning head assembly comprising
a scanning head housing,
a radiant energy output port in said scanning head housing aligned with said radiant energy input port of said fixed housing,
a rotatable support journalled in said scanning head housing on said energy receiving axis,
a reflector journalled in said rotatable support about a second axis normal to said energy receiving axis, said reflector including radiant energy reflective means for receiving energy projected toward said scanning head housing along a viewing axis and reflecting said energy through said output port and into said fixed housing input port, and
means for mounting said scanning head housing to said fixed housing for angular motion about an axis aligned with the energy receiving axis of said fixed housing.

2. The apparatus of claim 1 wherein said reflector comprises a mirror having a reflective surface lying in a plane that is spaced from said second axis by a distance that is considerably less than the dimensions of said reflector as measured in said plane.

3. The scanning apparatus of claim 1 including means for oscillating said rotatable support about said energy receiving axis between first and second terminal positions, and including means for rotating said reflector about said second axis.

4. The scanning apparatus of claim 3 including first pickoff means for generating a position signal indicative of at least one position of said rotatable support during oscillation thereof.

5. The apparatus of claim 4 including second pickoff means for generating a second position signal indicative of a predetermined position of said rotatable support relative to said reflector.

6. The apparatus of claim 5 including output means for generating an output indication of intensity of radiant energy received by said scanning head, said output means including location means responsive to said first and second pickoff means for generating signals representative of position of said reflecting means.

7. The apparatus of claim 6 including a second pickoff means, and wherein said output means includes a display device having an intensity indicating beam, and means responsive to said sensor for intensity modulating said beam, said location means including first beam deflection means responsive to said first pickoff and second beam deflection means responsive to said second pickoff.

8. The apparatus of claim 7 wherein said location means comprises means responsive to said first pickoff means for generating a deflection trigger signal for the deflection means as said rotatable support begins to move from one of the terminal positions of its oscillation and for generating a deflection termination signal as said rotatable support approaches the other terminal position of its oscillation, whereby deflection of said beam is slaved to portions of the rotation of the reflective means between but not including terminal portions of the oscillation about said first axis energy receiving.

9. The apparatus of claim 8 wherein said means for generating deflection signals includes means responsive to said first pickoff means for generating first and second dwell time signals during relatively small portions of the motion about each terminal portion of each oscillation.

10. Scanning apparatus comprising
a support,
a scanner pivoted to the support for oscillatory motion between first and second terminal positions,
means for driving said scanner between said terminal positions to achieve said oscillatory motion,
pickoff means for indicating position of said scanner with respect to said support, and
means responsive to said pickoff means for generating dwell time signals that occur at and about the time at which the scanner reaches each said terminal position of its oscillatory scan.

11. The apparatus of claim 10 including a display device having a display beam, means responsive to energy received by said scanner for modulating said beam, means for deflecting said beam in accordance with motion of said scanner, and means responsive to said dwell time signals for preventing deflection of said beam at positions thereof corresponding to said terminal positions.

12. A scanning system comprising
a fixed housing having a set of fixed optics defining an optical axis,
a scanning head housing journalled to the fixed housing on said axis,
a scanning mirror mounted to said scanning head housing for scanning motion about at least one scanning axis and positioned to reflect received energy along said optical axis during portions of the mirror scanning motion, said one scanning axis being coincident with said optical axis,
means for oscillating said mirror about said one scanning axis and
means for rotating said mirror about a second scanning axis that is angularly oriented with respect to said one scanning axis,
said mirror comprising a thin rigid body of relatively high mass having oppositely disposed mutually parallel reflective surfaces positioned close to and parallel to said second scanning axis.

13. A scanning system comprising
a fixed housing having a set of fixed optics defining an optical axis,
a scanning head housing journalled to the fixed housing on said axis, and
a scanning mirror mounted to said scanning head housing for scanning motion about at least one scanning axis and positioned to reflect received energy along said optical axis during portions of the mirror scanning motion, said scanning axis being coincident with said optical axis.

14. The system of claim 13 including means for oscillating said mirror about said one scanning axis, and including means for rotating said mirror about a second scanning axis that is angularly oriented with respect to said one scanning axis.

15. A scanning system comprising
a fixed housing having a set of fixed optics defining an optical axis,
a scanning head housing journalled to the fixed housing on said axis, and
a scanning mirror mounted to said scanning head housing for scanning motion about two mutually angulated scanning axes and positioned to reflect received energy along said optical axis during portions of the mirror scanning motion.

16. The system of claim 15 wherein one of said scanning axes is coaxial with said optical axis of said fixed optics.

17. The system of claim 16 wherein said mirror has a reflective surface that lies substantially in a plane containing the other of said scanning axes.

18. The method of focusing a radiant energy receiving system having a control for varying the focal length thereof, said method comprising steps of
scanning a viewing axis of the radiant energy receiving system across at least a portion of a target,
generating signals indicative of intensity of energy received from the target by said system during said scanning, and
operating said control in accordance with said signals to vary the focal length of the system in a sense to maximize intensity of received energy.

19. The method of claim 18 wherein said step of scanning comprises the steps of repetitively scanning the same portion of said target and actuating the control to vary the focal distance of the system so as to maximize generated signals representative of at least a pair of different points of the scanned portion of the target.

20. The method of claim 18 wherein said step of scanning comprises causing said viewing axis to repetitively scan a relatively narrow strip of said target, wherein said step of generating signals indicative of intensity comprises generating a B-scan display having an analog representation of intensity of energy received from points in said narrow target strip that are successively viewed during said scanning, and wherein said step of operating said control to vary the focal distance of said receiving system comprises operation of the control to vary the focal distance in a sense to increase the amplitude of at least one point of said analog representation.

21. Radiant energy scanning apparatus comprising
a set of fixed optics including
a fixed housing,
a radiant energy transducer mounted in the housing,
a fixed optical system mounted to the housing for collecting energy directed along an input optical axis and directing such collected energy to said radiant energy transducer and including a
a primary energy collector,
means for moving the primary energy collector along said input optical axis for focusing the optical system, a scanning head assembly, means for mounting the scanning head assembly to said fixed housing for rotation about said input optical axis relative to the housing, said scanning head assembly comprising a scanning head housing having an input port adapted to receive energy projected from a target and having an output port for projecting energy received via said input port, said output port being aligned with the input optical axis of said fixed optical system, a support journalled in said housing for pivotal motion about a first scanning axis coincident with said input optical axis of the fixed optical system, a mirror journalled in said support for rotation about a second scanning axis that is angulated with respect to said first scanning axis, a motor driven cam mounted to said scanning head housing for oscillating said support between first and second terminal positions of an oscillatory scan about said first axis, oscillatory pickoff means mounted to said support and to said scanning head housing for generating first and second oscillatory scan pickoff signals at said first and second terminal positions respectively of said oscillatory scan, a motor carried by the support and connected to drive said mirror about said second scanning axis in a continuous scan, continuous scan pickoff means mounted to the mirror and to the support for generating continuous scan pickoff signals representative of at least one predetermined position of the mirror during the course of said continuous scan, said mirror comprising a thin, rigid sheet of relatively high mass having first and second mutually parallel reflective surfaces defining planes parallel to said second scanning axis, a first display device comprising a cathode ray tube having an intensity control circuit, a Y axis deflection circuit, an X axis deflection circuit, a blanking circuit, and an intensity modulation circuit, a Y axis sweep generator comprising means for generating a ramp signal having positive going and negative going ramp portions, means for applying said ramp signal to said Y axis deflection circuit, a dwell generator responsive to said oscillatory scan pickoff signals for generating a first ramp sync signal, means responsive to said oscillatory scan pickoff signal for generating a second ramp sync signal, and means responsive to said first and second ramp sync signals for synchronizing the initiation and termination of each of said positive and negative going ramp portions of said ramp signal, a horizontal sweep generating circuit for generating a horizontal sweep sawtooth, means for transmitting said horizontal sweep sawtooth to said X axis deflection circuit, means responsive to the continuous scan pickoff signal for synchronizing said horizontal sweep generating circuit, a horizontal sweep blanking gate circuit, means responsive to the continuous scan pickoff signal for providing a first triggering input to said horizontal blanking gate circuit, means responsive to said horizontal sweep generating circuit for providing a second triggering input to said horizontal blanking gate circuit, means responsive to said horizontal blanking gate circuit for transmitting a blanking signal to said cathode ray tube blanking circuit, and means responsive to said radiant energy transducer for feeding an intensity modulating signal to said modulation circuit of the cathode ray tube.

22. The apparatus of claim 21 including a selectively variable intensity control, first switching means for alternatively coupling to said modulation circuit either the output of said radiant energy transducer or said selectively variable intensity control, second switching means for alternatively connecting to said Y axis deflection circuit either said ramp signal or the video signal provided by said radiant energy transducer, and means for actuating said first and second switching means simultaneously.

23. The apparatus of claim 22 wherein said cathode ray tube includes a screen having a short persistence, a camera mounted to view said screen, said camera having a shutter and a shutter control, means responsive to a first signal from said oscillitory scanning pickoff for operating said shutter control to open the camera shutter, and means responsive to a following signal from said oscillatory scanning pickoff for operating the shutter control to close the camera shutter.

24. The apparatus of claim 23 wherein said means for operating said shutter control comprises a camera control command circuit and manually controlled means for enabling said command circuit, said command circuit comprising means responsive to a first one of said oscillatory scanning pickoff signals for operating the shutter control to open said shutter and means responsive to a following oscillatory scanning pickoff signal for operating the shutter control to close the camera shutter and to disable the command circuit.

25. The apparatus of claim 22 including means for disabling the oscillatory scanning of said mirror, means responsive to said radiant energy transducer for detecting amplitude of energy received by the transducer, and means for moving said primary energy collector in one direction or the other along the input optical axis in a sense to increase the amplitude of energy received by the transducer.

26. For use with a radiant energy receiver, focusing apparatus comprising means for causing the receiver to scan at least a portion of a target upon which the receiver is to be focused, means responsive to energy received by the receiver during said scan for generating signals representing intensity of energy received from the target, means responsive to said signal generating means for indicating maxima of said energy received from said target, and means responsive to said maxima indicating means for changing the focus of said receiver in a sense to increase intensity of energy received from the target.

* * * * *